United States Patent [19]
Bijasiewicz et al.

[11] 3,823,568
[45] July 16, 1974

[54] METHOD AND APPARATUS FOR AIR CONDITIONING VEHICLES

[76] Inventors: Tadeusz M. Bijasiewicz, 123 Keifer Dr.; Howard S. Orr, 2080 Outlook Dr., both of Upper St. Clair Township, Pa. 15241; Donald E. Vierling, 1016 Cochran Rd., Mt. Lebanon Township, Allegheny County, Pa. 15243

[22] Filed: Aug. 29, 1973

[21] Appl. No.: 392,800

[52] U.S. Cl............... 62/7, 180/54 B, 62/52, 165/42, 165/63, 62/243, 62/244, 62/186, 62/89
[51] Int. Cl.............................................. F25b 19/00
[58] Field of Search............... 180/54 B; 62/7, 52; 165/42, 63

[56] References Cited
UNITED STATES PATENTS

| | | | |
|---|---|---|---|
| 2,183,452 | 12/1939 | Gibbs | 62/7 |
| 2,701,133 | 2/1955 | Mendez | 62/7 |
| 3,021,681 | 2/1962 | Perry | 62/7 |
| 3,183,962 | 5/1965 | Steinhagen | 165/42 |
| 3,378,063 | 4/1968 | Mefferd | 62/7 |
| 3,670,808 | 6/1972 | Wait | 165/42 |

Primary Examiner—William J. Wye
Attorney, Agent, or Firm—Martin J. Carroll

[57] ABSTRACT

In land and water vehicles using cryogenic fuels the liquified fuel is heated and vaporized in an air conduit leading to the passenger compartment of the vehicle. This is done by controlling the volume and temperature of the air delivered to that section of the air conduit containing the fuel. The evaporation of the fuel cools the air which is then fed into the passenger compartment to cool the compartment. In winter the air can be heated by the engine coolant to a degree sufficient to heat the passenger compartment.

9 Claims, 4 Drawing Figures

METHOD AND APPARATUS FOR AIR CONDITIONING VEHICLES

This invention relates to a method and apparatus for air conditioning vehicles using cryogenic fuels, such as liquified natural gas, to operate their engines. The fuel is contained in a tank at a pressure of about 20 PSI and a temperature slightly below −259°F. Before burning in the engine the fuel has to be vaporized and heated to a temperature of about 60°F. It has been proposed to use air to heat and vaporize the fuel and then use this air to air condition the passenger compartment of the vehicle, such as an auto or boat. Those systems of which we have knowledge have various drawbacks. In particular they do not have proper controls to supply air under suitable conditions to vaporize the gas and/or cool the passenger compartment properly. Art of which we have knowledge are Mendez U.S. Pat. No. 2,701,133 dated Feb. 1, 1955, Hayes U.S. Pat. No. 2,835,333 dated May 20, 1958 and Petsinger U.S. Pat. No. 3,565,201 dated Feb. 23, 1971.

It is an object of our invention to provide a method and apparatus for air conditioning vehicles using cryogenic fuels in which the temperature and volume of air supplied to vaporize the fuel is controlled for proper operation.

Another object is to provide such a method and apparatus in which the temperature of the vaporizing air is then controlled prior to entering the passenger compartment of the vehicle.

A further object is to provide such a method and apparatus in which the volume of air, the inlet temperature of the air and the end temperature of the air can each be controlled separately.

These and other objects will become more apparent after referring to the following specification and drawings, in which.

Figure 1:
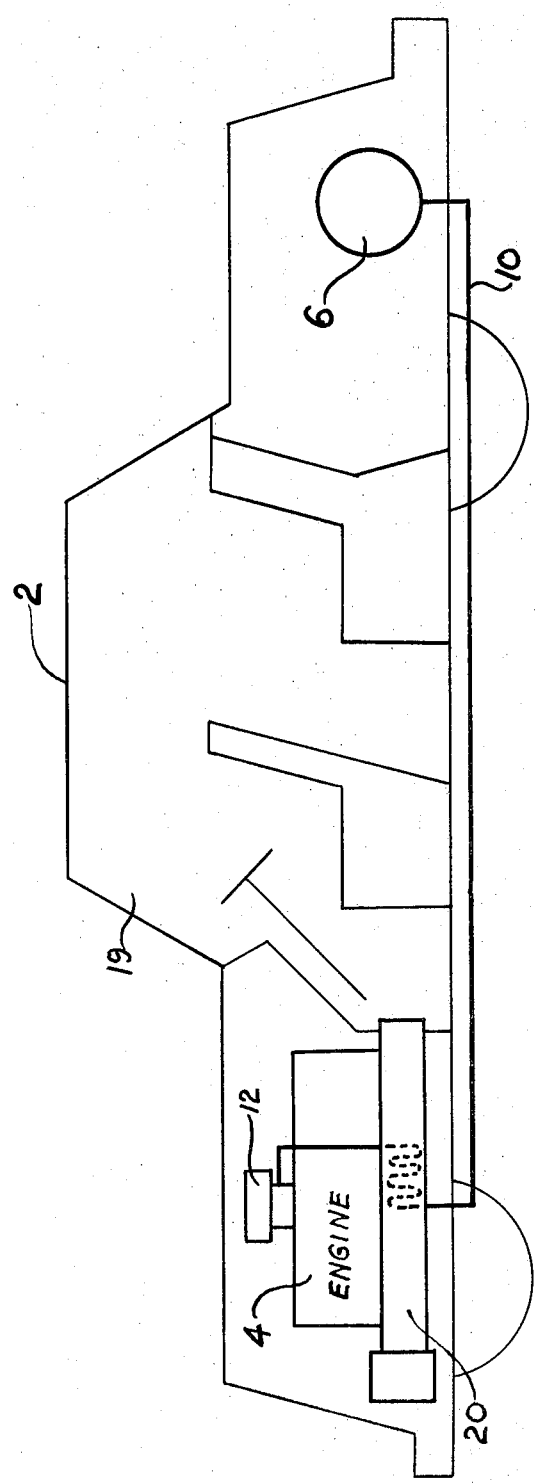
FIG. 1 is a schematic view of a portion of our invention as installed in an automobile.
Figure 2:
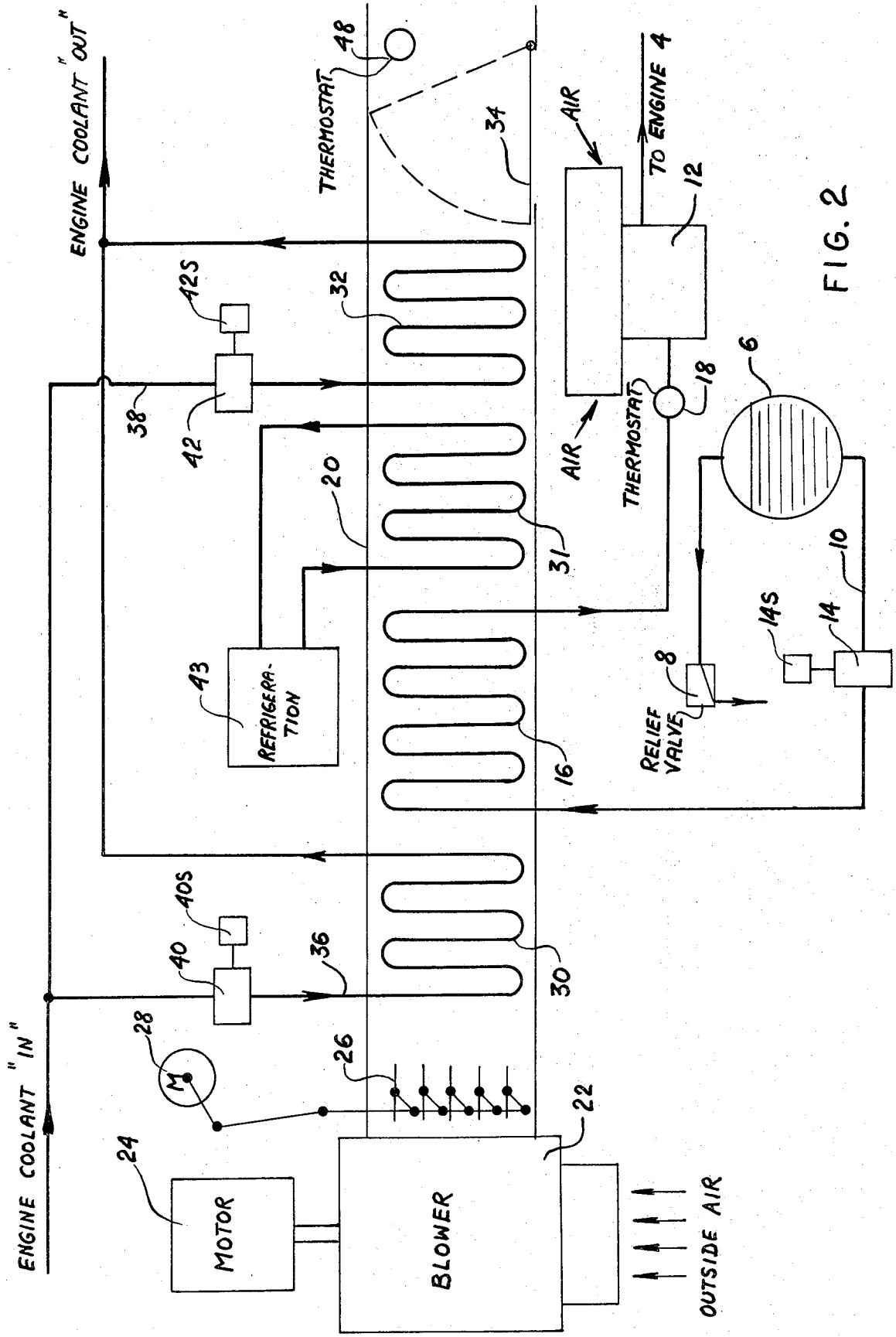
FIG. 2 is a diagrammatic view of our invention.

Referring more particularly to FIGS. 1 and 2 of the drawings, reference numeral 2 indicates an automobile having an engine 4 and a fuel tank 6. Liquid cryogenic fuel, such as natural gas, is maintained at a pressure of about 20 pounds per square inch in tank 6 by means of a relief valve 8 connected thereto. A conduit 10 connected to the tank 6 leads to an air fuel mixer 12 connected to the engine 4. A solenoid valve 14 connected in conduit 10 controls flow of fuel in a manner to be described later. An evaporator coil 16 and thermostat 18 are located in conduit 10. Outside air is delivered to passenger compartment 19 of the auto through a conduit 20 by means of a blower 22 driven by an electric motor 24. A damper 26 positioned by motor 28 is located in conduit 20. Also located in series in conduit 20 are heating coil 30, evaporator coil 16, cooling coil 31, heating coil 32 and manually controlled baffle valve 34. The heating coils 30 and 32 are connected by means of conduits 36 and 38 to the coolant for engine 4. Solenoid valves 40 and 42 are located in conduits 36 and 38, respectively, for controlling flow of coolant. Cooling coil 31 is connected to a standard vapor compression refrigeration system 43 powered by engine 4.

Figure 3:
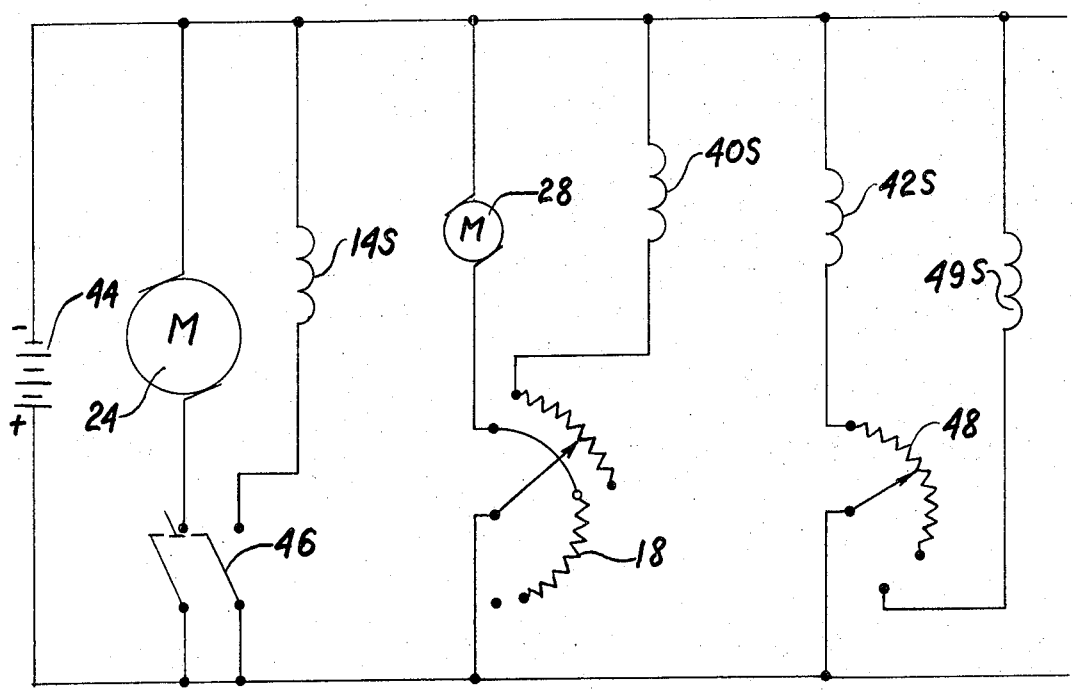
FIG. 3 is a wiring diagram of one embodiment of our invention.

As shown in FIG. 3, motors 24 and 28 are energized by battery 44. The motor 24 and solenoid coil 14S of valve 14 are connected in parallel and their operation is controlled by a switch 46 which closes when the ignition key is turned on. Thermostat 18 is connected in series with motor 28 and solenoid 40S of valve 40 which are connected in parallel. A thermostat 48 located in passenger compartment 19 is connected in series with solenoid 42S of valve 42 and also to solenoid 49S which operates the compressor clutch (not shown) of compression refrigeration system 43. The thermostats 18 and 48 are of proportional types so that movement of the parts controlled are proportional to the magnitude of the deviation from the desired norm.

The volume and temperature of the air required to evaporate and heat the fuel to about 60°F is sufficient to cool the interior of a small boat or an automobile under all conditions and the auxiliary refrigeration system 43 will be omitted in such installations. In larger vehicles, such as buses or excursion boats, the standard auxiliary vapor compression refrigeration system 43 powered by the main engine will be used to assist the cooling, particularly when the vehicle is stationary or moving at a low speed.

In operation the system is set up for the desired conditions. For example, the blower 22 is selected and adjusted to supply enough air at about 80°F to vaporize and heat the fuel to about 60°F at its average consumption rate. Thermostat 18 is selected, adjusted and connected to air damper motor 28 and valve 40 so that valve 40 remains shut unless air damper 26 is fully open. When the engine is turned on, motor 24 is also turned on and valve 14 opens. Thus air is delivered to the inside of the auto and fuel is delivered to the mixer 12. If more or warmer air is needed to evaporate the fuel, thermostat 18 causes damper 26 to open proportionally according to the air required. If the damper 26 opens fully and there is not sufficient evaporation of the fuel, the thermostat 18 will cause valve 40 to open proportionally as required to supply enough engine coolant (which will be at higher than ambient temperature) to heating coil 30 to raise the temperature of the air. If less or cooler air is required, the operation is the reverse of the above. If the temperature of the air supplied to the passenger compartment 19 is too high, thermostat 48 will cause valve 42 to open proportionally to obtain the desired temperature. In winter, sufficient heat can be provided by coil 32 to enable the system to act as heater.

If no cooling or heating is required, the baffle valve 34 will be positioned manually to deflect the air to the outside.

When the auxiliary system is included, thermostat 48 will cause energization of solenoid 49S to engage the compressor clutch to cause operation of system 43 when the temperature within the vehicle rises above a preset temperature. As soon as the temperature falls below the preset temperature the clutch will be disengaged and the main cooling system will take over completely.

Figure 4:
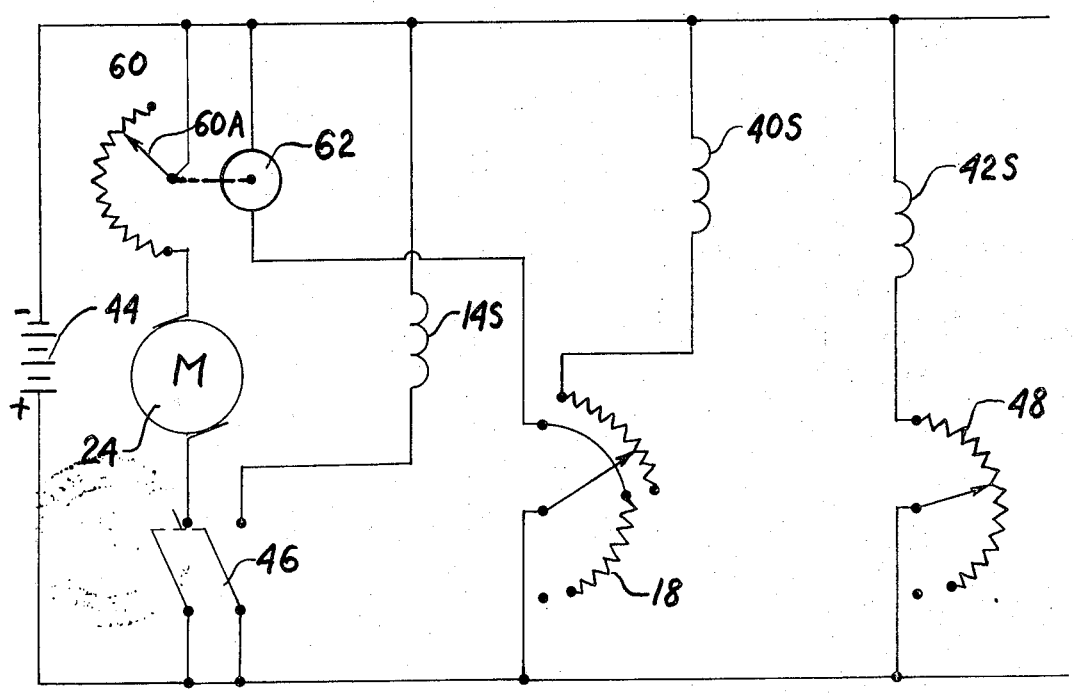
FIG. 4 is a wiring diagram of a second embodiment of our invention.

In the embodiment shown in FIG. 4 the air damper 26 and its motor 28 are eliminated and in place thereof a variable resistance 60 is connected in series with motor 24. A motor 62 connected in series with thermostat 18 drives arm 60A to vary the resistance 60 to change the speed of motor 24 proportionally to vary the air supply in essentially the same manner as the air supply is varied in the first embodiment. The operation is otherwise the same as in the first embodiment.

In some instances, such as when cooling a small passenger space, the damper 26 and/or resistance 60 may be eliminated and a constant air flow provided by blower 22. The evaporation of the fuel will then be controlled solely by regulating the flow of engine coolant through coil 30. It should be noted that the use of the main engine coolant for heating the air causes decrease in the coolant temperature with resultant improved performance of the engine. Suitable baffles and deflectors may be provided in the air duct system to avoid discomfort to passengers from excessive air flow.

The invention is also applicable in those cases where standard fuel, such as gasoline, is used with oxygen which is stored in liquid form. In such a case the cooling system operates in the same way as above except that the oxygen takes the place of the fuel. In other words the invention is applicable to a liquified cryogenic combustion supporting gas whether the gas be the fuel and/or the oxidizing agent.

While several embodiments of our invention have been shown and described it will be apparent that other adaptations and modifications may be made within the scope of the following claims.

We claim:

1. In a vehicle having a compartment, an engine, a reservoir for containing a liquified cryogenic combustion supporting gas under pressure, and a conduit for supplying said combustion supporting gas to said engine; the combination including an air conduit having its exit end connected to said compartment, means for supplying air to the entry end of said air conduit, an evaporating section in said gas conduit located in said air conduit, a heating section in said air conduit between its entry end and said evaporating section, and means for controlling the heat supplied by said heating section.

2. The combination of claim 1 including means for controlling the volume of air supplied by said air supplying means.

3. The combination of claim 1 including a second heating section in said air conduit between its discharge end and said evaporating section, and means for controlling the heat supplied by said second heating section.

4. The combination of claim 3 including means for controlling the volume of air supplied by said air supplying means.

5. The combination of claim 4 in which said combustion supporting gas is the fuel, and said apparatus includes a liquid engine coolant conduit connected to said first heating section, a second liquid engine coolant conduit connected to said second heating section, a first thermostat located in said fuel conduit on the exit side of said evaporating section, a second thermostat located in said compartment, means operated by said first thermostat for controlling flow of liquid engine coolant to said first heating section, means operated by said second thermostat for controlling flow of liquid engine coolant to said second heating section, and means operated by said first thermostat for controlling flow of air into said air conduit.

6. The combination of claim 5 including a cooling section in said air conduit between the exit end thereof and said evaporating section, a refrigeration system powered by said engine, and means for connecting said refrigeration system to said cooling section.

7. In a vehicle having a compartment, an engine, a reservoir for containing a liquified cryogenic combustion supporting gas under pressure, and a conduit for supplying said gas to said engine, and an air conduit leading to said compartment; the method of evaporating said liquified gas and controlling the temperature in said compartment which comprises passing said gas in said gas conduit through said air conduit, supplying air into the entry end of said air conduit, and controlling the temperature of air in said air conduit supplied to said gas passing through said air conduit, the temperature and volume of said air passing over said liquified gas being such as to evaporate the liquified gas.

8. The method of claim 7 in which said liquified gas is the fuel, and said method includes varying the temperature of said air in said air conduit after it passes the fuel therein.

9. The method of claim 8 which includes controlling the volume and temperature of said air before it reaches said fuel in accordance with the temperature of said fuel in said air conduit after the fuel passes from said air conduit, and controlling the temperature of said air at the exit end of said air conduit in accordance with the temperature in said compartment.

* * * * *